US008864496B2

(12) United States Patent
Moran et al.

(10) Patent No.: US 8,864,496 B2
(45) Date of Patent: *Oct. 21, 2014

(54) VEHICLE CREW TRAINING SYSTEM

(75) Inventors: Sean C. Moran, Ormond Beach, FL (US); Donnie R. Klein, Ormond Beach, FL (US); Mark D. Haack, Ormond Beach, FL (US); Sharon E. Lay, Daytona Beach, FL (US); Christopher J. Howard, Daytona Beach, FL (US); Michael J. Dineen, Deltona, FL (US); Jerry R. Hubbard, Port Orange, FL (US); William M. Araki, Port Orange, FL (US)

(73) Assignee: Raydon Corporation, Port Orange, FL (US)

( * ) Notice: Subject to any disclaimer, the term of this patent is extended or adjusted under 35 U.S.C. 154(b) by 725 days.

This patent is subject to a terminal disclaimer.

(21) Appl. No.: 11/055,708

(22) Filed: Feb. 11, 2005

(65) Prior Publication Data
US 2006/0183083 A1 Aug. 17, 2006

(51) Int. Cl.
*F41A 33/00* (2006.01)
*G09B 9/00* (2006.01)

(52) U.S. Cl.
CPC .............. *G09B 9/003* (2013.01); *F41A 33/00* (2013.01)
USPC .......................................................... 434/11

(58) Field of Classification Search
CPC ...................................................... F41A 33/00
USPC ..................................................... 434/11, 16
See application file for complete search history.

(56) References Cited

U.S. PATENT DOCUMENTS

| 5,347,910 | A | * | 9/1994 | Avila et al. ................... 89/41.22 |
| 5,444,624 | A | | 8/1995 | Wilkinson et al. |
| 5,513,131 | A | | 4/1996 | Wilkinson et al. |
| 5,648,632 | A | * | 7/1997 | Becker et al. ................ 89/41.05 |
| 6,053,736 | A | * | 4/2000 | Huffman et al. ................ 434/11 |
| 6,106,297 | A | * | 8/2000 | Pollak et al. .................... 434/16 |
| 6,611,822 | B1 | | 8/2003 | Beams et al. |
| 6,973,865 | B1 | * | 12/2005 | Duselis et al. ............... 89/41.05 |
| 2002/0072414 | A1 | * | 6/2002 | Stylinski et al. ................ 463/42 |
| 2003/0211450 | A1 | | 11/2003 | Sofia et al. |
| 2005/0017977 | A1 | | 1/2005 | Simpson et al. |
| 2007/0287133 | A1 | * | 12/2007 | Schubert et al. ................ 434/11 |

OTHER PUBLICATIONS

Office of Technology Assessment, Distributed Interactive Simulation of Combat, Sep. 1995, Congress of the United States, 1-61 pages.*
Molnar, J. Immersion of a live individual combatant into a virtual battlespace, 1997, Veda Incorporated, pp. 27-34.*
Boyd, Christopher, "Simulators Ready for Duty", Orlando Sentinel, Orlando, Florida, Money Section, Aug. 31, 2004, 4 pgs.

* cited by examiner

*Primary Examiner* — Kesha Frisby
(74) *Attorney, Agent, or Firm* — Sterne, Kessler, Goldstein & Fox P.L.L.C.

(57) ABSTRACT

A computer based simulation system for virtual training for vehicle crews is disclosed. The vehicle crew training system (VCTS) simulates crew positions for different military vehicles. Two or more crewman modules are networked together to support a partial or full vehicle crew. The crewman modules are self-contained devices that are modular in hardware and software design, easily reconfigurable, and that require minimal facility space, allowing use in restricted environments such as trailers. The VCTS is modular at the crew position level; crewman modules are added or deleted as required to meet a particular training need. One of the crewman modules can be a gunner module, which provides an unrestricted view of the simulated environment to the gunner by means of a display and a simulated vehicle-mounted weapon.

59 Claims, 9 Drawing Sheets

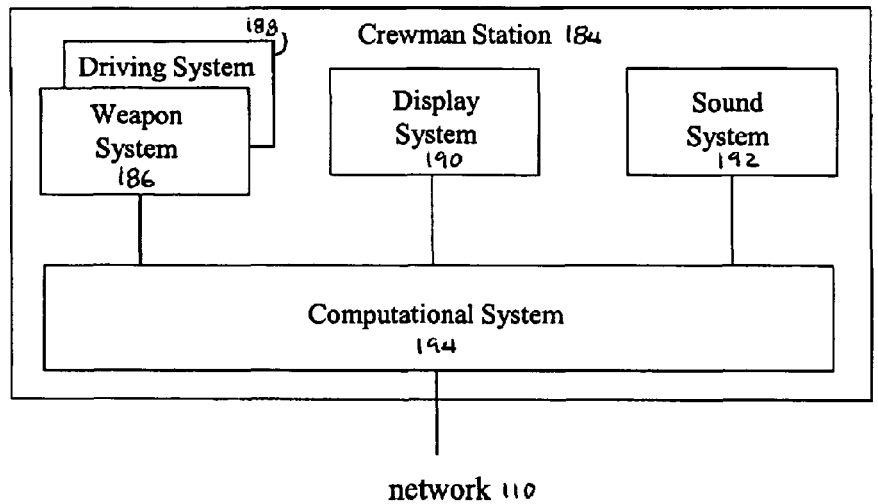

FIG. 2A

| | Driver | Gunner | Commander & Observer/Rifleman |
|---|---|---|---|
| Weapon System | N/A | CAL .50 machine gun, MK-19 grenade launcher, M240B 7.62 mm machine gun, M249 Semi Automatic Weapon, TOW Missile | M-16 rifle, M-4 rifle; virtual dismount is supported |
| Driving System | Steering wheel, transmission selector, brake & accelerator pedals | N/A | N/A |
| Display System | LCD Panels | HMD | HMD |
| Sound System | Vehicle & weapon sounds | Vehicle & weapon sounds | Vehicle & weapon sounds |
| Computational System | PC | PC | PC |

FIG. 2B

VEHICLE CREW TRAINING SYSTEM

FIELD OF THE INVENTION

The invention pertains to training simulators.

BACKGROUND OF THE INVENTION

System Design

Historically, most virtual crew training has been accomplished with appended trainers or with crew station trainers. An appended trainer consists of equipment added to an actual (parked) combat vehicle such that the vehicle is used to train a full or partial crew in a virtual environment. Examples are Raydon's Abrams Appended Trainer (A-FIST XXI) and the Bradley Appended Trainer (AB-FIST). A crew station trainer includes a replica of a crew compartment of an actual vehicle. Examples are Raydon's M-COFT XXI and SIMNET XXI trainers for the Abrams tank and the Bradley fighting vehicle. The appended and crew station trainers typically provide higher fidelity and very little modularity. Here, "fidelity" refers to the physical and functional realism of the man-machine interface, specifically, the realism of the vehicle and/or weapon controls in terms of numbers of controls and control realism; the realism of visual imagery in terms of field of view, resolution, and scene content; and the realism of the physical crew position in terms of the human support structure. Further, these trainers tend to be purpose-built for either individual/crew training or for collective training, but not both.

More recently, desktop training systems have emerged that are capable of training individuals and crews of military combat vehicles with less fidelity but at a much lower cost than the appended and crew station trainers. However, these desktop systems are not modular and, like the higher fidelity appended and crew station trainers, tend to be purpose-built for either individual/crew training or for collective training, but not both.

Hence, there is a need for a virtual crew training system that is sufficiently flexible to allow both individual/crew training and collective training, is modular, and can provide any level of fidelity.

Gunner Module

Current simulators for mounted weapons training use video projection screens and a fixed mount weapon mockup. Taken together, this results in a limited field of view for the gunner, i.e., the gunner can only look and shoot at scenes depicted on the projection screen. Typically, these screens are limited to the forward direction only.

This approach also requires more space to implement, making it impractical to use in standard trailers or portable shelters. One instantiation of this approach was implemented by the U.S. government at the Mounted Warfare Testbed in Fort Knox, Ky. Another instantiation of this approach was implemented by Lockheed Martin for the government's Virtual Combat Convoy Trainer program, as documented in the Aug. 31, 2004 *Orlando Sentinel*. Hence, there is a need for a mounted-weapon training simulator module that has a relatively small physical footprint, yet provides realistic perspective, i.e., in all possible directions, for a trainee's view and aim.

SUMMARY OF THE INVENTION

System Design

The vehicle crew training system (VCTS) is a computer-based simulation system intended to serve the virtual training needs of military users. However, unlike other simulation systems, the VCTS is modular at the crew-position level; crewman modules are added or deleted as required to meet a particular training need. The VCTS provides virtual training for vehicle crew members. "Virtual training" refers to a mode of training in which the trainee is immersed in a simulated environment as a participating entity, and in which results of all actions occur in real-time based on cause and effect. This is also referred to as "real-time, man-in-the-loop simulation." The simulation system also supports virtual dismounting of a trainee, such that the trainee may virtually exit the virtual vehicle while maintaining the ability to interact with the virtual environment from the vantage point of a dismounted position. Three modes of virtual training are supported: individual training; crew training; and collective training with multiple vehicle crews. The VCTS is able to simulate crew positions for different military vehicles and their associated weapon systems. The VCTS comprises crewman modules networked together to support a partial or full vehicle crew. Moreover, not only is the VCTS modular, but each crewman module is itself modular. The crewman modules are self-contained devices that are modular in hardware and software design, and easily reconfigurable. In addition, the crewman modules occupy a minimal physical footprint.

One instantiation of the VCTS is a high mobility multipurpose wheeled vehicle (HMMWV) trainer developed by Raydon Corporation, of Daytona Beach, Fla. This system can be used for virtual combat convoy training in a simulated geographical environment. In an embodiment of the invention, the simulated environment corresponds to an actual urban or rural setting. Future VCTS variants include, but are not limited to, the heavy expanded mobility tactical truck (HEMTT), the standard cargo truck, and the five-ton tactical truck.

The VCTS consists of two or more crewman modules networked together. A typical set of crewman modules constituting a VCTS includes a driver module, a commander module, and a gunner module. Via a network, other devices, such as an instructor station and a simulated radio, may be integrated with the VCTS. Additional crewman modules may be added for other crew members, such as an observer/riflemen. Vehicle crew training systems may also be linked together to form groups of simulated vehicles, such as platoons of three or four vehicles, where each vehicle is configured with two or more crewman modules. Two instructor stations may be included in these larger embodiments to facilitate training simultaneously with the conduct of after-action reviews of previously conducted exercises. Additional instructor stations may be added to facilitate individual and crew training.

Various embodiments of the invention, therefore, may or may not interface with the instructor station. However, it can be an important component of the overall training system. In embodiments where it is included, it initializes the different VCTS crewman modules, monitors the performance of the trainees, controls the operation of the simulated enemy and friendly forces during the various training exercises, and records all exercise events. In addition, the instructor station supports the conduct of after-action reviews (AARs), wherein previously conducted exercises are played back as an aid to the instructor's critique of trainee performance. An instructor station can also act as a surrogate driver in the absence of a driver module or any other missing crewmember. If two instructor stations are included, then it is possible to perform the exercise control and monitoring functions with the AAR function simultaneously.

The vehicle crew training system is designed in a modular fashion such that systems may be reconfigured to meet different training needs. Reconfiguration may involve adding, deleting, or changing the mix of crewman modules. Modularity also extends to the design of the crewman modules such that the weapon system and/or the vehicle type may be rapidly changed. For example, a .50 caliber machine gun in use on the HMMWV variant of the vehicle crew training system can be swapped for an MK-19 grenade launcher, a 7.62 mm machine gun, an M249 squad automatic weapon, or a tube-launched optically tracked wire-guided (TOW) missile launcher, for example. Note also that the weapon system can alternatively be a non-lethal weapon that might be used for such actions as crowd control, for instance. Examples of such non-lethal weapons include water cannons, devices for firing tear gas canisters or beanbags, and sound and microwave generators.

An embodiment of the invention can consist of four simulated HMMWV vehicles, each represented by a VCTS with five Crewman Modules. Two instructor stations and simulated radios can be interfaced with such an embodiment of the VCTS through a network. The system provides individual, crew, and collective training to platoons of HMMWV drivers, commanders, gunners and observer/riflemen.

The VCTS is designed to fit into a very constrained space, such as a semi-trailer or a portable shelter. The HMMWV trainer just described fits into two 53-foot semi-trailers.

Another embodiment of the VCTS is a HMMWV training system developed for the U.S. Army National Guard. This system can consist of five simulated HMMWV vehicles, where four of the vehicles are represented by VCTS's consisting of two crewman modules each and the fifth vehicle (external to any VCTS) is represented by an Appended HMMWV containing a driver and gunner position. Simulated radios and an instructor station can also be interfaced to the VCTS. The system provides individual, crew, and collective training to platoons of HMMWV drivers and gunners. The VCTS modules and the instructor station of this embodiment fit in one 53-foot semi-trailer.

Gunner Module

The gunner module embodies a unique approach to weapon system training for simulated ground vehicles. It provides an unrestricted view of the simulated environment to the gunner by means of a head-mounted display (HMD) and a moveable, vehicle-mounted weapon mock-up. The HMD provides a complete spherical (360-degree) field of regard (FOR) to the gunner; as the gunner moves his head, the instantaneous field of view (IFOV) changes in relation to the direction his head is pointed. The weapon mock-up is cradle/pintle-mounted on a 360-degree traverse ring to allow full 360-degree horizontal traverse, as well as the authentic amount of weapon pitch and yaw. External cabling is routed through a slip ring to allow unlimited rotations of the traverse ring. In addition, weapon mock-ups and the weapon software may be easily changed to simulate different vehicle-mounted weapons. Finally, the gunner module is very compact in size, allowing use in restricted environments such as trailers and mobile shelters.

Crewman modules may be of varying fidelity. For example, a lower fidelity desktop version of the gunner module may be used instead of the simulated crew position version described above. "Fidelity" in this context refers to the fidelity or realism of the man-machine interface as experienced by the trainee, i.e., the fidelity of the vehicle and/or weapon controls in terms of numbers of controls and the realism of the controls, the fidelity of visual imagery in terms of field of view, resolution, and scene content, and the fidelity of the physical crew position in terms of the human support structure.

The VCTS architecture supports any mix of varying fidelity crewman modules. Since the lower fidelity desktop versions provide subsets of the capabilities embodied in the simulated crew position versions, all discussions of crewman module will refer to the higher fidelity variants, unless specifically stated otherwise.

BRIEF DESCRIPTION OF THE DRAWINGS

FIG. 2A is a diagram showing the major components of a VCTS crewman module, in accordance with the embodiment of FIG. 1.

FIG. 2B is a table identifying the types and components that comprise a VCTS crewman module, in accordance with the embodiment of FIG. 2A.

DETAILED DESCRIPTION OF THE INVENTION

Embodiments of the invention are discussed in detail below. In describing embodiments, specific terminology is employed for the sake of clarity. The invention is not intended to be limited to the specific terminology so-selected. While specific exemplary embodiments are discussed, it should be understood that this is done for illustration purposes only. A person skilled in the relevant art will recognize that other components and configurations can be used without departing from the spirit and scope of the invention.

Figure 1A:
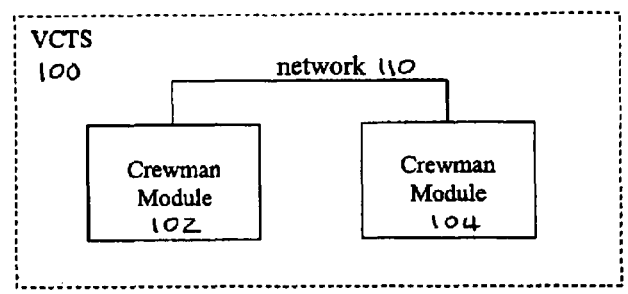
FIG. 1A is a diagram illustrating the minimum system configuration of the vehicle crew training system (VCTS), according to an embodiment of the invention.
Figure 1B:
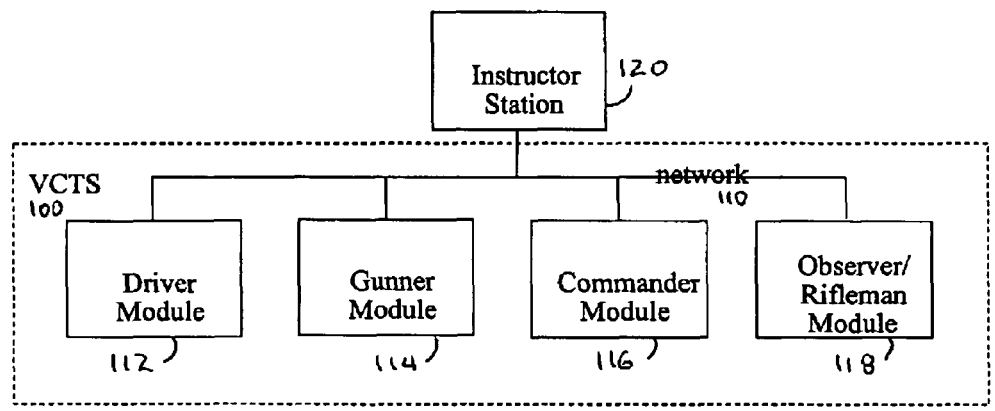
FIG. 1B is a diagram illustrating a typical full crew configuration of the VCTS, according to an embodiment of the invention.
Figure 1C:
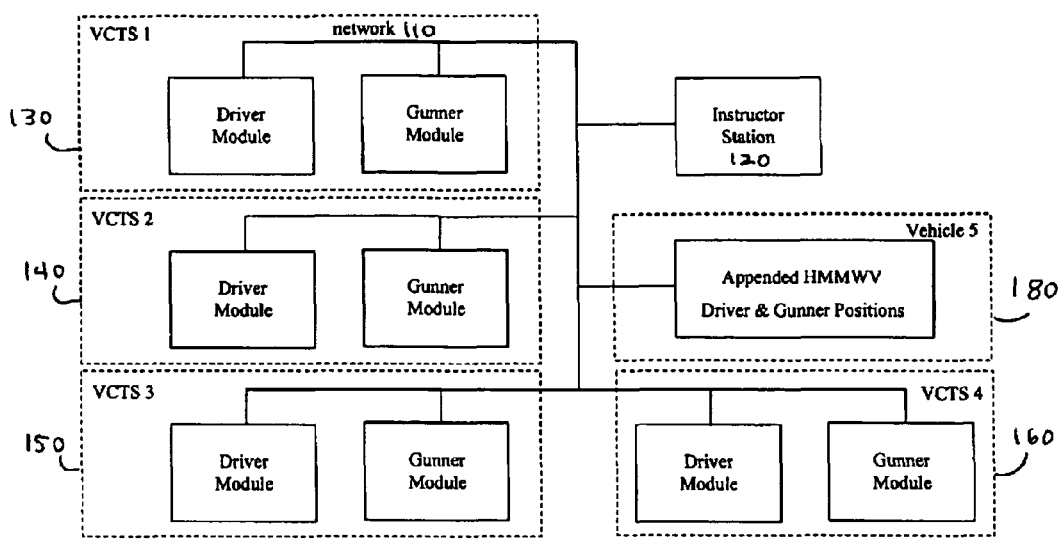
FIG. 1C is a diagram illustrating multiple VCTS systems linked together to support collective training, in accordance with the embodiments of FIG. 1A and 1B; this configuration is representative of a VCTS training system developed for the U.S. Army National Guard.

FIGS. 1A, 1B and 1C illustrate various embodiments of a VCTS system 100 in accordance with the present invention. The system is comprised of at least two crewman modules 102 and 104 connected via a network 110. Various embodiments currently comprise crewman modules, which can be, for example, a driver module, gunner module, commander module, and observer/rifleman module. Other crewman module types can be supported as needs dictate. These other modules could include, for example, alternate driver modules, crowd-control/riot-control modules, and non-lethal weapon modules. An embodiment of the system that supports a four-man crew is illustrated in FIG. 1B; this configuration of the system includes a driver module 112, a gunner module 114, a commander module 116, an observer/rifleman module 118, and network 110. An instructor station is shown connected to the VCTS. The instructor station 120 provides exercise control, monitoring, and evaluation. An embodiment of the invention that supports collective training is illustrated in FIG. 1C; four VCTS systems (130, 140, 150, and 160), each consisting of a driver module and a gunner module, and linked via network 110, support four vehicle crews. The four VCTS systems are linked via network 110 to an instructor station 170 and to an appended trainer 180, which supports a fifth vehicle crew.

FIGS. 2A and 2B illustrate the components and characteristics of an embodiment of a VCTS crewman module. Crewman modules are self-contained training devices that contain the necessary hardware and software to support virtual training for a single crewman. In an embodiment of the invention, a crewman module consists of a simulated weapon system 186 (or, in the case of a driver module, a driving system 188), a display system 190, a sound system 192, a computational system 194, and a crewman station 184. A simulated weapon system 186 can comprise a weapon mock-up, including all necessary controls such as triggers and arm/safe switches, and the electronics and cabling required to interface it with the computational system 194. A simulated driving system 188 can comprise a steering wheel, transmission selector, brake and accelerator pedals, and all other necessary controls, electronics and cabling required to drive the vehicle and to interface it with the computational system 194. The display system 190 consists of the display devices, such as head-mounted displays (HMDs) and liquid crystal display (LCD) panels, and the necessary electronics and cabling required to interface it with the computational system 194. Sound system 192 consists of amplified speakers and the necessary audio cabling to interface it with the computational system 194. Weapon and vehicle sounds are broadcast to the trainee via the sound system 192. The computational system 194 consists of a commercially available PC (or a programmable computing platform of comparable capability, but referred to herein generically as a PC) augmented with standard devices and ports to enable communication with other crewman module hardware components, with other crewman modules, and with external systems such as instructor stations and other vehicle simulators. The crewman station 184 consists of the physical structure that contains and/or supports the trainee, as well as all of the components that comprise a crewman module.

The computational system 194 contains the crewman module software. In an embodiment of the invention, the crewman module software consists of a commercially available operating system and application software. The major functions performed by the application software include simulating vehicle movement, weapon aiming, firing, and impact effects, image generation of visual scenes, interfacing with the various hardware components, and interfacing with other crewman modules and with external systems, such as other vehicle simulators, via the network. The application software in the driver module has the additional functions of calculating collision with other objects in the virtual world and of terrain following by the driver's virtual vehicle.

Figure 3:
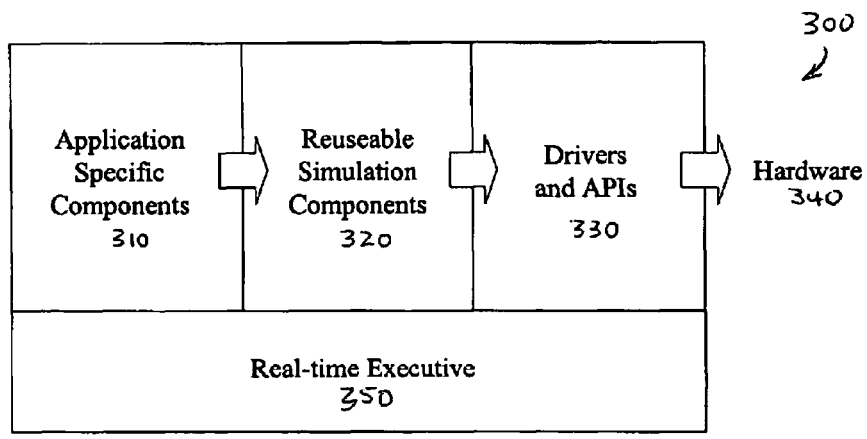
FIG. 3 is a diagram illustrating the componentized architecture of the VCTS software, in accordance with the embodiments of FIGS. 1 and 2.

FIG. 3 illustrates the VCTS application software architecture 300 according to an embodiment of the invention. The software architecture can be an object-oriented design comprised of components, which are encapsulated pieces of software with a defined functional purpose and a defined interface. The purpose of componentizing the application software is to minimize rework and maximize reuse as new vehicles and new weapons are incorporated into the VCTS design.

Software components are categorized as either being application-specific or reusable. If the latter, they are placed into a library of reusable components. In an embodiment of the invention, one or more application specific components 310 generally links to one or more reusable components 320 to perform a given function. A collection of drivers and application program interfaces (APIs) 330 may also be included with the application software to interface with hardware 340. Drivers and APIs 330 include drivers for the video and data acquisition cards housed in the PC, as well as network, joystick and sound drivers and the API for the visual software. Underlying the components, drivers and APIs is the real-time executive software 350 that provides the universal means for components, drivers and API's to communicate via messages, events, and data reflection through its interface. The real-time executive software 350 can also be componentized.

Figure 4A:
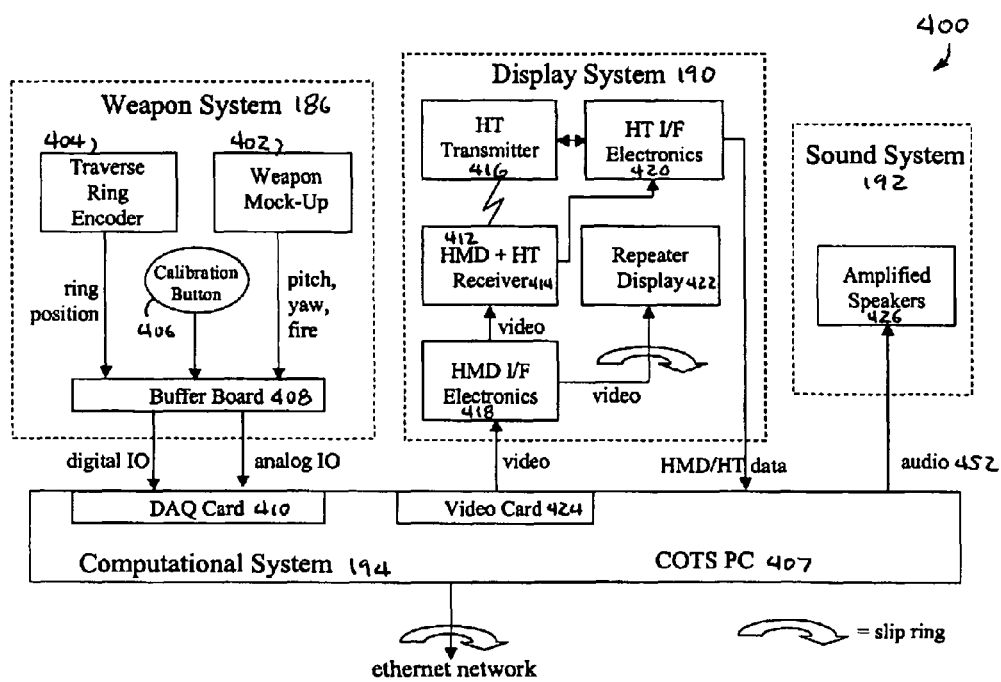
FIG. 4A is a functional block diagram of the VCTS gunner module hardware in accordance with the embodiments of FIGS. 1, 2 and 3.
Figure 4B:
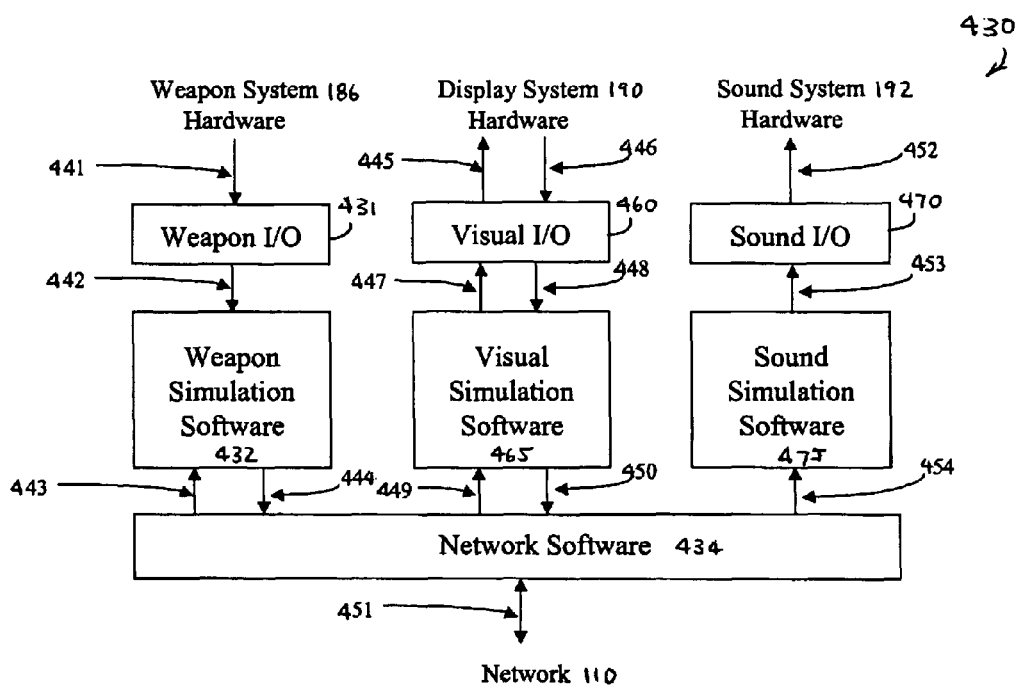
FIG. 4B is a functional software diagram of the VCTS gunner module in accordance with the embodiments of FIGS. 1, 2 and 3.

FIG. 4A is a functional hardware diagram of an embodiment of the gunner module, and FIG. 4B is a functional software diagram of this embodiment of the gunner module. The illustrated weapon system is comprised of weapon mock-up 402, traverse ring encoder 404, calibration button 406, and an interface device 408. The weapon mock-up 402, in one embodiment of the invention, is a simulated .50 caliber machine gun. The position, pitch and yaw of the simulated weapon are measured continuously, and fed back to PC 407 via the interface device 408. One example of such an interface device 408 is a buffer board, as shown in FIG. 4A. A calibration signal is fed back to the PC 407 via the interface device 408 when the trainee pushes the corresponding button 406. The interface device 408 applies signal conditioning to the incoming signals and sends the data to a data acquisition (DAQ) card 410 in the PC 407. Referring to FIG. 4B, the weapon I/O software 431 in the PC 407 inputs the data 441 from the DAQ Card 410, formats it, and outputs the formatted weapon data 442 to the weapon simulation software 432. Weapon data 442 is received continuously and includes weapon position, pitch, yaw, and trigger pull. The calibration signal is sent only during the weapon calibration process. The weapon simulation software 432 computes a trajectory for the bullets and outputs projectile position data 444 to the network software 434. The weapon simulation software 432 receives own-vehicle state data 443 continuously from the network software 434. This data is used to compute the position of the weapon in the virtual environment.

In the embodiment illustrated of FIG. 4A, the display system 190 is comprised of a head-mounted display (HMD) 412 with an attached head tracker (HT) receiver 414, an HT transmitter 416 mounted above the gunner position and the HMD and HT interface electronics (418 and 420, respectively). In addition, an LCD panel is provided to serve as a video repeater 422 for the benefit of the instructor. In this embodiment of the invention, an acoustic HT system senses the position and attitude of the HMD 412, and continuously feeds the data to the PC 407 via the HMD/HT data interface. Referring to FIG. 4B, HT data 446 is continuously input to visual I/O software 460 where it is formatted and then output (see 448) to visual simulation software 465. The visual simulation software 465 uses the formatted HT data 448 to determine the position and look angle of the head relative to the visual scene that is displayed to the trainee wearing the HMD 412. In an embodiment of the invention, the visual simulation software 465 also performs the following functions:

Rendering of the visual scene according to the HT-supplied look angle (in data 448) and according to own-vehicle state data 449 received from the network software 434;
Full color, perspectively correct, anti-aliased and textured image generation;
Imagery affected by atmospheric and weather effects;
Night vision simulation;
Rendering of other vehicles according to vehicle state data 449 received from the network software 434;
Input of own-weapon projectile data 444 and subsequent impact detection processing;
Weapon effect generation and rendering based on own-weapon projectile impact detection;
Weapon effect generation and rendering based on weapon impact data (in data 444) received from the network software 434;
Output of own-vehicle weapon impact and collision data 450 to the network software 434;
Collision detection of the own-vehicle with other objects in the virtual world;
Terrain following by the own-vehicle; and
Output of video 447 to the visual I/O software 460.

The visual I/O software 460 formats the video and sends it to the video card 424 in the PC 407 (see FIG. 4A); the video 445 is then output to the display system 190 as standard VGA video.

In the illustrated embodiment, the network software 434 sends and receives data 451 to and from the network 110. Data sent to the network 110 includes projectile state data received from the weapon simulation software 465, and weapon impact and collision data received from the visual simulation software 465. Data received from the network 110 includes own-vehicle state data plus the state of all other vehicles and projectiles that are active in the virtual environment.

In the embodiment of the invention shown in FIG. 4A, a sound system 192 generates aural cues synchronized with and representative of actions and events in the virtual environment. Sounds can caused by, for example, own vehicle and other vehicle movements, own weapon and other weapon firing, weapon impacts and explosions caused by own weapons or other weapons, and could even include environmental "noise" such as crowd noise.

The sound system 192 includes amplified speakers 426 that receive audio 452 from the PC 407 via standard audio cables in an embodiment of the invention. The sound I/O software 470 is a sound driver that receives the sound data 453 from sound simulation software 475 and formats it for use by the standard sound hardware in the PC 407. The sound simulation software 475 creates sounds based on weapon and vehicle state data 454 that is received from the network software 434. Sound files representing different battlefield sounds are created off-line and then stored in a sound file library; during real-time, the sound simulation software 475 accesses the appropriate sound files and weights them appropriately to create aural cues for the trainee.

In an embodiment of the invention, the computational system 194 consists of a commercially available PC equipped with 2 GB of main memory and a Pentium 4® CPU; Windows XP® may be used as the operating system. In this embodiment, the DAQ 410 card is a commercially available PCI card that supports both analog and digital signals. The video card 424 may be a commercially available PCI graphics card.

Figure 5A:
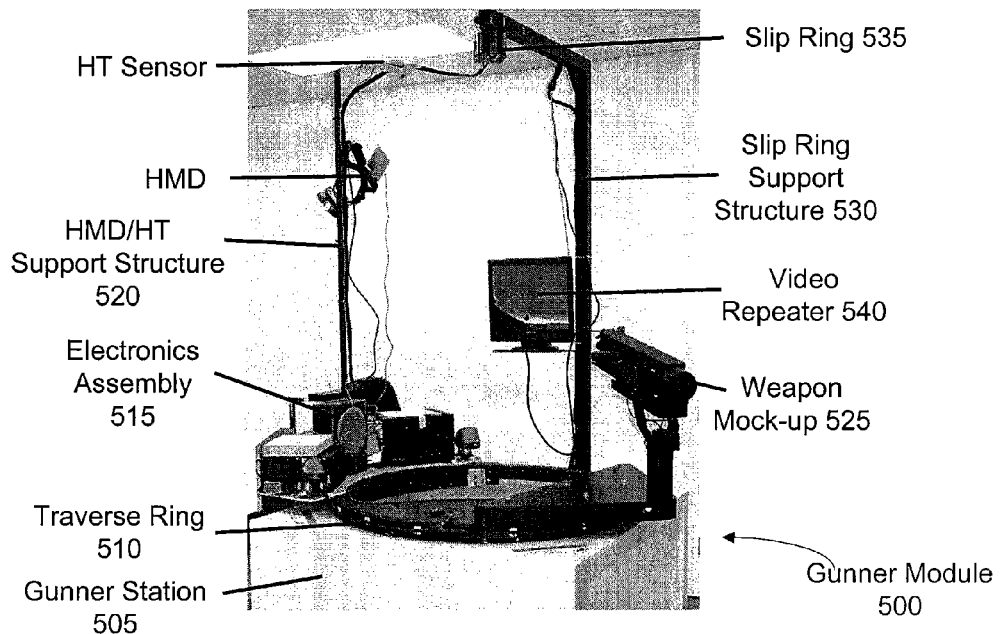
FIG. 5A is a photograph of the overall VCTS gunner module in accordance with the embodiments of FIGS. 1, 2, 3 and 4.

FIG. 5A is a photograph illustrating the overall mechanical design of a gunner module 500, according to an embodiment of the invention. The gunner module 500 is built on a gunner station 505, which is a large aluminum box with a large circular hole cut in the top panel. A traverse ring 510 is fastened to the top of the box. The traverse ring 510 consists of a pallet carousel modified for use with the gunner module 500. An electronics assembly 515, an HMD/HT support structure 520, and a weapon mock-up 525 are attached to the traverse ring 510 such that they move with the traverse ring 510 in response to trainee pressure. A slip ring support structure 530 is attached to the gunner station 505, such that it remains fixed in space regardless of traverse ring rotation. A slip ring 535 and a video repeater 540 are attached to this support structure. Each of these items is described in more detail in the following paragraphs.

Figure 5B:
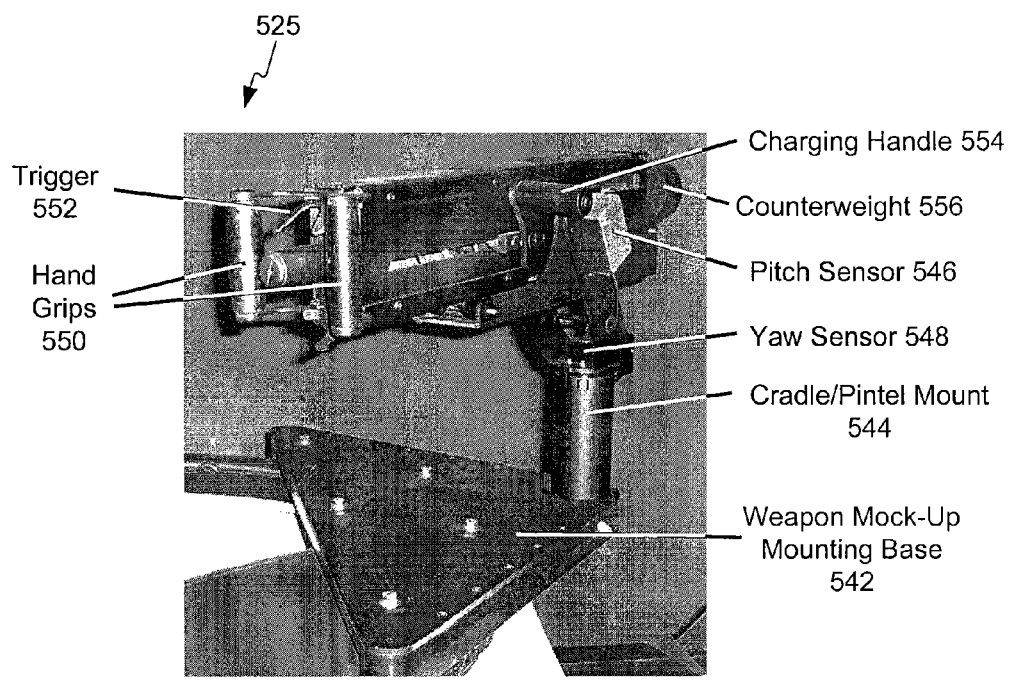
FIG. 5B is a photograph of the gunner module weapon mock-up, a simulated .50 caliber machine gun in accordance with the embodiments of FIGS. 4 and 5A.

FIG. 5B is a photograph illustrating an embodiment of the mechanical design of the weapon mock-up 525, which in this embodiment of the invention is a .50 caliber machine gun. A mounting base 542 for the simulated weapon is attached to the traverse ring 510, such that the simulated weapon moves when the traverse ring 510 moves. The main body of the gun is attached to the mounting base 542 via a cradle/PINTLE mount 544 that permits simultaneous pitch and yaw aiming of the simulated weapon. Pitch and yaw sensors 546 and 548 built into the cradle/PINTLE mount 544 consist of potentiometers that change voltage in direct proportion to the rotation of the simulated weapon in each axis. Attached to the back end of the main body of the simulated weapon are hand grips 550 and a trigger 552 that are used by the trainee to aim and fire the weapon. A charging handle 554 is included in the mechanical design, but it is not functional in the illustrated embodiment. A counterweight 556 is attached to the front end of the main body of the simulated weapon in order to provide a realistic heft and balance to the trainee.

Figure 5C:
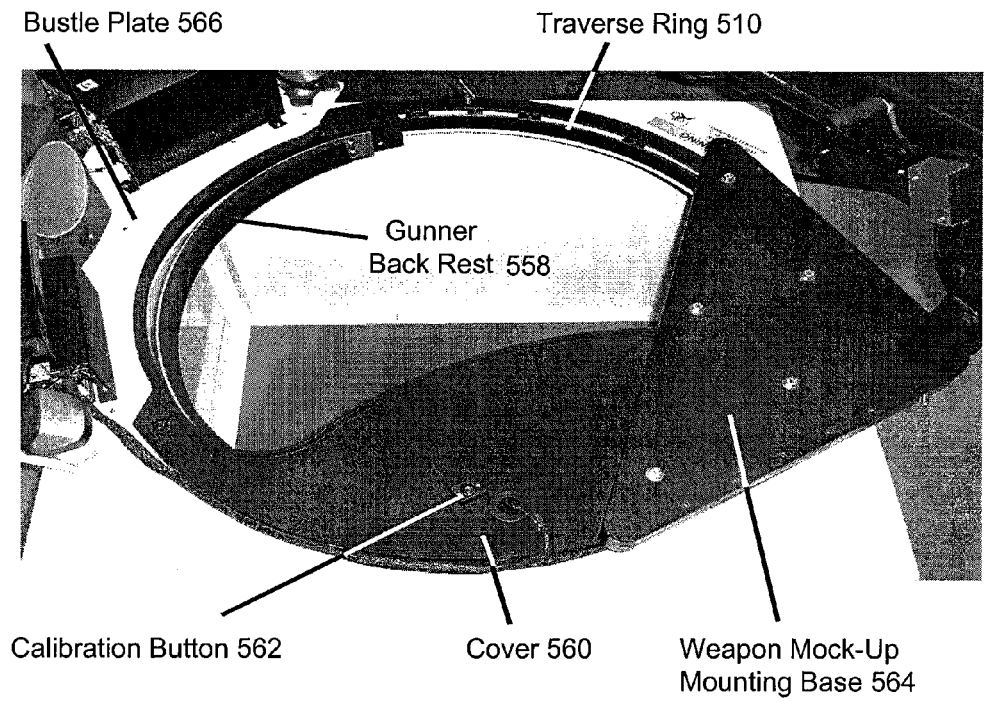
FIG. 5C is a photograph of the gunner module traverse ring assembly in accordance with the embodiments of FIGS. 4 and 5A.

FIG. 5C is a photograph illustrating the mechanical design of the traverse ring 510 and attached components, according to an embodiment of the invention. As shown, the traverse ring 510 is a circular carousel attached to the top panel of the gunner station 505. It rotates freely in both directions in response to trainee pressure applied to a gunner back rest 558. A cover 560 is attached to the traverse ring 510 to simulate the space constraints of a HMMWV-mounted .50 caliber machine gun; it is also used to mount the calibration button 562 and, on the underside of the cover 560, the traverse ring encoder (not shown). A weapon mock-up mounting base 564 and a bustle plate 566 are also attached to the traverse ring 510, such that all of the components mounted to these support surfaces move with the traverse ring 510.

Figure 5D:
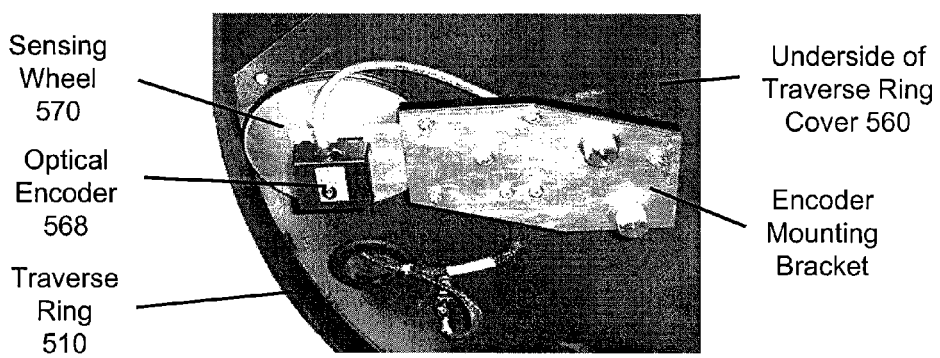
FIG. 5D is a photograph of the gunner module traverse ring encoder in accordance with the embodiments of FIGS. 4 and 5A.

FIG. 5D is a photograph of an embodiment of the traverse ring optical encoder 568 which, as mentioned above, is attached to the underside of the traverse ring cover 560. A sensing wheel 570 is a metal wheel with a rubber o-ring that is positioned against the inside of the traverse ring 510, such that the wheel moves when the traverse ring 510 moves. Optical encoder 568 senses the rotation and converts it to an eight-bit digital signal. This signal is routed back to the data acquisition card in the PC via the interface device.

Figure 5E:
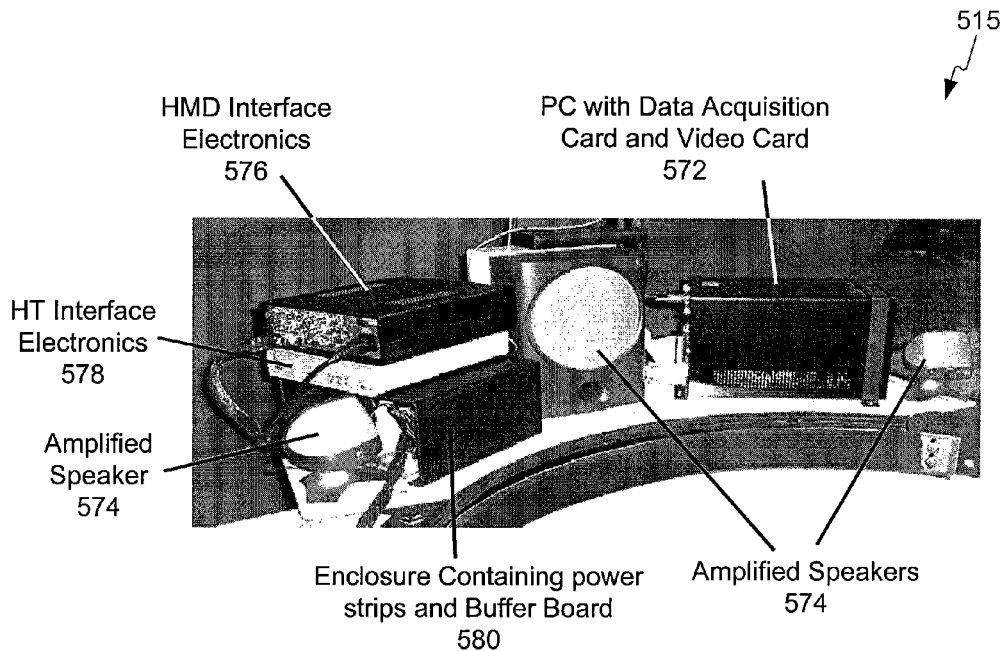
FIG. 5E is a photograph of the gunner module electronics assembly in accordance with the embodiments of FIGS. 4 and 5A.

FIG. 5E is a photograph illustrating the mechanical design of the electronics assembly 515 of the gunner module 500, according to an embodiment of the invention. This assembly is attached to the bustle plate 566 such that the entire electronics assembly 515 moves with the traverse ring 510. The components that comprise the electronics assembly 515 can include the following:

A commercially available PC with DAQ and video cards, 572;

Amplified speakers 574;

HMD interface electronics 576;

Head tracker (HT) interface electronics 578; and

Enclosure containing power strips and the interface device, 580.

Figure 5F:
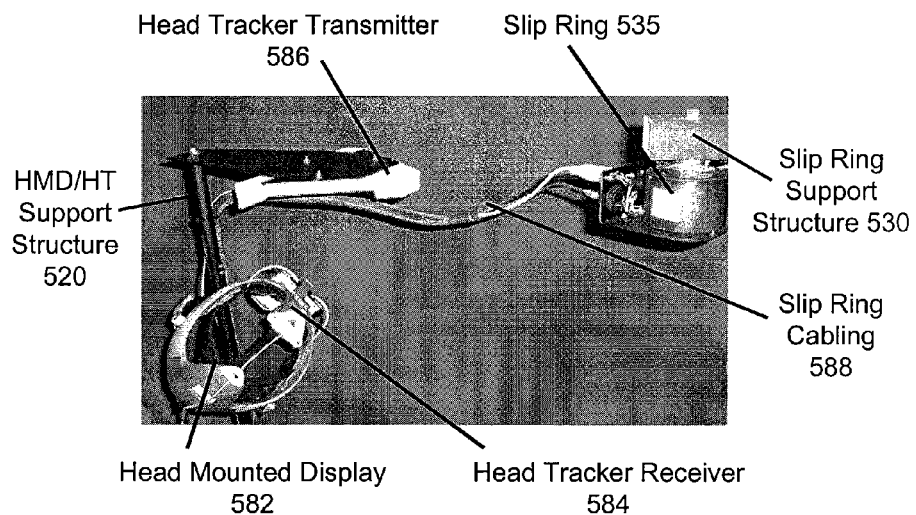
FIG. 5F is a photograph of the gunner module slip ring assembly, head-mounted display and head tracker in accordance with the embodiments of FIGS. 4 and 5A.

FIG. 5F is a photograph illustrating the mechanical design of the superstructure of the gunner module 500, according to an embodiment of the invention. The HMD/HT support structure 520 is attached to the bustle plate 566 which, in turn, is attached to the traverse ring 510, such that the HMD/HT support structure 520 and components attached to it move with the traverse ring 510. The HMD 582 can be hung on the HMD/HT support structure 520 when not in use. In the illustrated embodiment, the HMD 582 is a commercially available display device that provides a view of the virtual environment to the trainee directly in front of his eyes. Standard VGA video is fed to the HMD 582. A sensor is attached to the top of the HMD 582; this is the HT Receiver 584. The HT receiver 584 works in concert with an HT transmitter 586, which is attached to a mounting plate on the top of the HMD/HT support structure 520. For this embodiment of the invention, an acoustic HT system is employed; acoustic signals are transmitted by the HT transmitter 586 and received by the HT receiver 584. As the trainee head (and therefore the HMD 582) moves, the time required for the acoustic signals to travel the distance between the HT transmitter 586 and the HT receiver 584 continuously changes in direct proportion to the distance between the transmitting and receiving devices. The visual simulation software computes the position and orientation of the HMD 582 (and therefore the trainee's head) based on these signals.

For this embodiment of the invention, the slip ring 535 is attached to the slip ring support structure 530, which is attached to the main body of the gunner station 505. Therefore, the slip ring 535 stays fixed in space as the traverse ring 510 moves. The slip ring 535 is a commercially available device that routes wires through the slip ring 535 to the HMD/HT support structure 520. As the traverse ring 510 moves, slip ring cabling 588 moves in a circular motion around the slip ring 535, but cable connections are maintained. Since most of the electronics are mounted on the bustle plate 566 or otherwise attached to the traverse ring 510, only a few wires are passed over the slip ring cabling 588. They include:

Ethernet cabling for the ethernet network that connects the gunner module 500 to other crewman modules or to external systems;

a VGA video cabling for the video repeater 540 attached to the slip ring support structure 530; and Power cabling for the various electronic devices attached to the traverse ring 510.

In another embodiment of the invention, the slip ring could be integrated into the traverse ring.

Note that, in addition to the HT apparatus discussed above, other mechanisms could be used to track the position and/or orientation of the head of the gunner trainee. Examples include inertial head trackers and eye trackers, both of which are known in the art.

Figure 6:
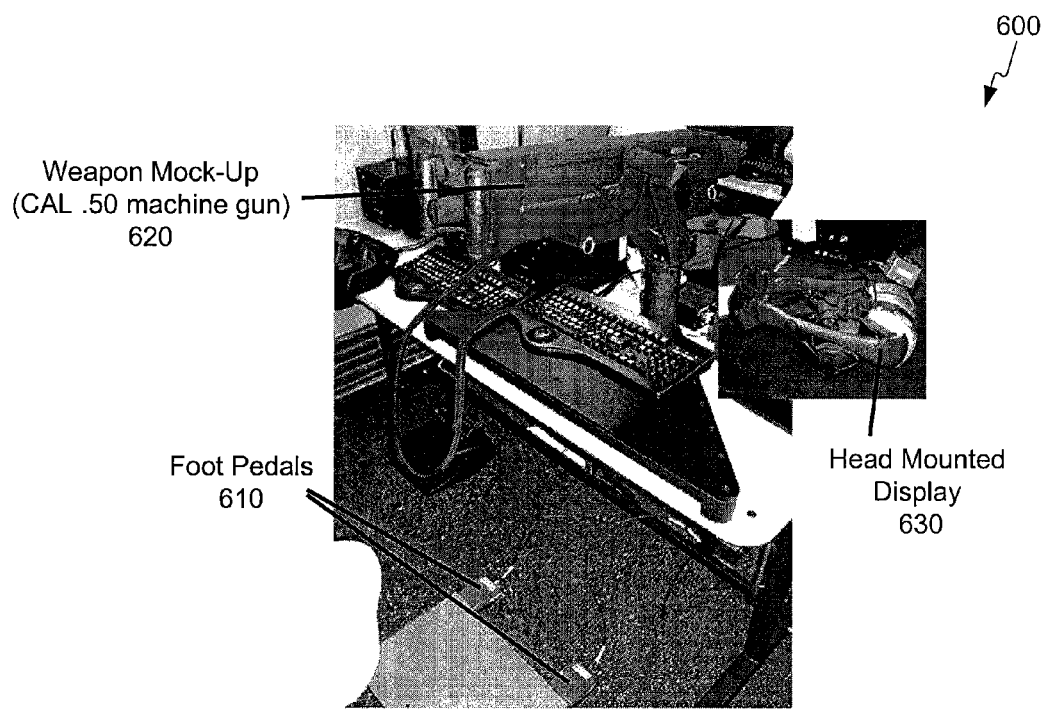
FIG. 6 is a photograph of a lower fidelity desktop variant of a gunnery module, according to an embodiment of the invention.

FIG. 6 is a photograph of an embodiment of a lower fidelity desktop variant 600 of the gunner module. This version of the gunner module provides all of the functionality of the higher fidelity gunner module described above. Differences include those relating to the fidelity of the device. For example:

The gunner simulates moving a traverse ring using foot pedals 610 and software that moves a weapon mock-up 620 around the simulated ring; the imagery displayed to the gunner on an HMD 630 presents the view that the gunner would see if he moved the traverse ring with his feet and back as he would on the higher fidelity variant of the gunner module.

A lower fidelity HMD 630 is used with reduced resolution and with angular tracking only. i.e., only in the direction that the Gunner's head is pointed is sensed by the head tracker.

While various embodiments of the present invention have been described above, is should be understood that they have been presented by way of example, and not limitation. It will be apparent to persons skilled in the relevant art that various changes in form and detail may be made therein without departing from the spirit and the scope of the invention.

What is claimed is:

1. A computer-based simulation system for training vehicle crew members for operation of a multi-crew member vehicle, the simulation system comprising:

a plurality of self-contained modules of the multi-crew member vehicle configured to be connected to one another by a network, wherein each module comprises:

a self-contained physical structure configured to provide a position for only an individual crew member of the multi-crew member vehicle, dedicated to a simulation of a single distinct crew station of the multi-crew member vehicle, and configured to operate while geographically separated from at least one other of the plurality of self-contained modules; and a mechanical mockup within the self-contained physical structure, configured to dedicate the module to the simulation of the single distinct crew station, wherein the self-contained modules are modular in hardware and software design and reconfigurable for simulation of different vehicles, weapon types, control elements or subsystem types, the hardware modularity including modularity of the mechanical mockup.

2. The system of claim 1, wherein each said module is comprised of a crew station, a computational system, a display system, and a sound system, which collectively perform:

reception of signal data from the mechanical mockup, said signal data to be analyzed to yield a simulated effect, on the common virtual environment, of actions performed by the individual crew member using the mechanical mockup;

visual rendering of said common virtual environment using said computational system;

presenting resultant imagery to the individual crew member through said display system;

enabling communication with other crewman modules and with external simulation systems over the network by means of said computational system; and sound simulation, wherein aural cues are generated in response to actions and events that occur in the virtual environment, said events including actions and events resulting from actions performed by the individual crew member using the mechanical mockup, are generated using said computational system, and are output to the individual crew member using said sound system;

wherein said module provides a physical position for the individual crew member to operate the crew station including the mechanical mockup.

3. The system of claim 2, wherein said modules are networked together such that:
  crew members operating said modules are associated with, move with, and interact with the same vehicle in the virtual environment;
  each module communicates vehicle state, weapon state, and parameters as necessary to others of said modules;
  crew members observe the common virtual environment independently, such that they may view completely different, partly overlapping or the same portions of said virtual environment;
  crew members hear sounds representative of actions occurring in the common virtual environment such that said actions are apparent to the crew members even if said actions are not viewable on a crew member's individual display system;
  an instructor station can be interfaced with said crewman modules through said network to perform exercise control functions, to monitor crewman actions, to collect training data for individual crewman modules and for system operation, or to act as a module for a surrogate crewman;
  a second simulation system can be interfaced with the crewman modules via said network to participate in simulation activity as a second virtual vehicle; and
  a simulated radio system can be interfaced through the network to communicate messages between crew positions and to external systems.

4. The system of claim 3, wherein said crewman modules comprise a gunner module from which a gunner trainee can aim and fire a simulated vehicle mounted weapon, wherein said gunner module is implemented as the mechanical mockup.

5. The system of claim 4, wherein said gunner module allows said gunner trainee and said simulated weapon to collectively rotate in a horizontal plane through an unrestricted angular displacement.

6. The system of claim 5, wherein said gunner module comprises a traverse ring and slip ring that permits said rotation.

7. The system of claim 5, wherein said simulated weapon is cradle/pintle-mounted to said traverse ring, and can be made by said gunner trainee to pivot about two axes so as to pitch and yaw independently from said rotation.

8. The system of claim 5, wherein a view resulting from said rotation and pivoting is observable to said gunner trainee.

9. The system of claim 4, wherein said gunner module is constructed in a modular manner that permits physical and software reconfiguration to simulate use of an alternative vehicle mounted weapon.

10. The system of claim 9, wherein said alternative weapon is
  a non-lethal crowd control device.

11. The system of claim 4, wherein said simulated weapon is
  a non-lethal crowd control device.

12. The system of claim 4, wherein said simulated weapon has substantially realistic controls, weight, and feel to said gunner trainee, relative to the weapon being simulated.

13. The system of claim 4, wherein said gunner module comprises a gunner station which in turn comprises:
  a weapon system implemented as the whole of or a part of the mechanical mockup;
  a display system;
  a sound system; and
  a computational system in communication with said weapon, display, and sound systems, and in communication with a data network.

14. The system of claim 13, wherein said computational system comprises:
  network software; and
  weapon simulation software,
  wherein said weapon simulation software receives pitch, yaw, and trigger pull data, computes a trajectory and position data for virtual ordinance, outputs said ordnance position data to said network software, and receives its own vehicle state data from said network software to compute a weapon position.

15. The system of claim 13, wherein said computational system further comprises visual simulation software that receives tracker data and renders an image based on said tracker data, vehicle state data received from network software, and own-weapon projectile data.

16. The system of claim 13, wherein said weapons system comprises:
  a traverse ring encoder that creates ring-position data based on the orientation of a traverse ring;
  a slip ring that permits unrestricted rotation of the traverse ring;
  a calibration mechanism that can be activated by said crewman trainee to generate a calibration signal;
  said simulated vehicle-mounted weapon, wherein said weapon generates pitch, yaw, and firing data based on manipulation of said weapon by said crewman trainee; and
  an interface device that receives and forwards to a computational system, said ring position data, said calibration signal, and said pitch, yaw, and firing data.

17. The system of claim 13, wherein said gunner module further comprises a head-mounted display system that comprises:
  a tracker system that detects the orientation of the head of said gunner trainee and sends resulting data to a computational system, wherein said display system receives video data from said computational system and presents an image based on said video data to said gunner trainee.

18. The system of claim 17, wherein said image available to said gunner trainee is presented to said gunner trainee through said head-mounted display system, represents a view of a virtual environment, and is independent of the orientation of said simulated weapon.

19. The system of claim 17, wherein said head-mounted display provides the gunner trainee with a full spherical field of regard.

20. The system of claim 1, wherein all modules collectively fit into a portable structure approximately eight feet wide or less.

21. The system of claim 1, wherein each module is constructed in a modular manner that permits physical and software reconfiguration to simulate an alternative vehicle.

22. The system of claim 21, wherein said alternative vehicle is one or:
  a high mobility multi-purpose wheeled vehicle;
  a heavy expanded mobility tactical truck;
  a standard cargo truck; and
  a five-ton tactical truck.

23. The system of claim 1, wherein at least one of said modules comprises a commander module or an observer/rifleman module, comprising:
  a crew station implemented as the whole of or a part of the mechanical mockup;

a weapon system implemented as the whole of or a part of the mechanical mockup;
a display system;
a sound system; and
a computational system in communication with said weapon, display, and sound systems, and in communication with said network.

24. The system of claim 23, wherein said weapons system comprises
a hand-held weapon mockup configured to be aimed and fired into the virtual environment by a crew member.

25. The system of claim 23, wherein said display system comprises
a head-mounted display configured to provide a full spherical field of regard to the crew member based on a head orientation of the crew member.

26. The system of claim 1, wherein said crewman module is a driver module comprising:
a driver station implemented as the whole of or a part of the mechanical mockup;
a driving system implemented as the whole of or a part of the mechanical mockup;
a display system;
a sound system; and
a computational system in communication with said driving, display, and sound systems, and in communication with said network;
wherein said computational system and presents an image based on said video data to a driver crew member.

27. The system of claim 26, wherein said display system receives video data from said computational system and presents an image based on said video data to said driver crew member.

28. The system of claim 26, wherein said driving system comprises a driver interface, comprising:
a steering wheel;
a transmission selector;
a brake pedal; and
an accelerator pedal;
wherein inputs by said crew member to said driver interface are received by said computational system and control movement of said multi-crew member vehicle.

29. The system of claim 1, wherein said module is configured to present said common virtual environment to a crew member at one of a plurality of levels of fidelity, the plurality of levels of fidelity representing varying amounts of relative functional realism of vehicle or weapon controls in the virtual multi crew member vehicle.

30. The system of claim 1, wherein said mechanical mockup comprises at least one of a mechanical mockup of:
a weapon, a weapon support element, a weapon control element, a defensive device, a sensing device, a control element of the vehicle, a navigational element of the vehicle, or a physical structure that contains and/or supports the individual crew member.

31. The system of claim 1, wherein said software design comprises a memory configured with a layered software system, said layers comprising:
a first layer of application specific software;
a second layer of reusable simulation components coupled to said first layer; and
a third layer of hardware-specific drivers and application programming interfaces (APIs), said drivers and APIs coupled to said second layer and at least one computer system of said one or more dedicated computer systems.

32. A self-contained crewman module for use in a simulation system simulating operation of a multi-crew member vehicle, comprising:
a self-contained physical structure configured to provide a position for only an individual crew member of the multi-crew member vehicle, dedicated to a simulation of a single distinct crew station of the multi-crew member vehicle, and configured to operate while geographically separated from at least one other crewman module; and
a mechanical mockup within the self-contained physical structure, configured to dedicate the module to the simulation of the single distinct crew station,
wherein the self-contained crewman module is modular in hardware and software design and reconfigurable for simulation of different vehicles, weapon types, control elements or subsystem types, the hardware modularity including modularity of the mechanical mockup, and
wherein the self-contained crewman module is configured to communicate vehicle state and weapon state parameters with a second self-contained crewman module.

33. The self-contained crewman module of claim 32 wherein said mechanical mockup comprises:
a gunner module for training a gunner crew member, from which the gunner crew member can aim and fire a simulated vehicle-mounted weapon, the gunner module comprising a hardware and software design that is reconfigurable to simulate a plurality of vehicle-mounted weapons; and
a head-mounted display with a full spherical field of regard that permits the gunner trainee to look in any direction independent of the direction in which the weapon is pointed.

34. The self-contained crewman module of claim 33, wherein the gunner module allows said gunner trainee and said simulated weapon to collectively rotate in a horizontal plane through an unrestricted angular displacement.

35. The self-contained crewman module, of claim 34, wherein the gunner module comprises a traverse ring and slip ring that permit said rotation.

36. The self-contained crewman module of claim 35, wherein said simulated weapon is cradle/pintle-mounted to said traverse ring, and can be made to pivot in two axes by said gunner trainee independently from said rotation, so as to allow said simulated weapon to pitch and yaw.

37. The self-contained crewman module of claim 36, wherein a view resulting from said rotation and pivoting is observable to said gunner trainee.

38. The self-contained crewman module of claim 33, wherein the gunner module is constructed in a modular manner that permits physical and software reconfiguration of the mechanical mockup and a computer to which said mechanical mockup is linked to simulate use of an alternative vehicle mounted weapon.

39. The self-contained crewman module of claim 38, wherein said alternative vehicle mounted weapon is
a non-lethal crowd control device.

40. The self-contained crewman module of claim 33, wherein said simulated weapon is
a non-lethal crowd control device.

41. The self-contained crewman module of claim 33, wherein said simulated weapon has substantially realistic controls, weight, and feel to said gunner trainee, relative to the weapon being simulated.

42. The self-contained crewman module of claim 33, wherein an image available to said gunner trainee via said head-mounted display represents a view of a simulated environment, and is independent of the orientation of said simulated weapon.

43. The self-contained crewman module of claim 42, wherein said head-mounted display comprises:
a tracker system that detects the orientation of the head of said gunner trainee and sends resulting data to a computational system, wherein said head-mounted display receives video data from said computational system and presents an image based on said video data to said gunner trainee.

44. The self-contained crewman module of claim 33, wherein said gunner module further comprises a sound system to provide aural cues to said gunner trainee, wherein the aural cues are synchronized with and represent actions and events in a common virtual environment.

45. The self-contained crewman module of claim 33, wherein said gunner module comprises a gunner station which in turn comprises:
a weapon system implemented as the whole of or a part of the mechanical mockup;
the head-mounted display;
a sound system; and
a computational system in communication with said weapon, head-mounted display, and sound systems, and in communication with a data network.

46. The self-contained crewman module of claim 45, wherein said network allows communication with a second training, module configured to receive a second respective trainee, such that said gunner trainee and said second trainee participate in a common virtual environment.

47. The self-contained crewman module of claim 45, wherein said network allows communication between the gunner module and an instructor station that allows an instructor to perform exercise control, monitor trainee actions, collect training data, and act as a surrogate crewman.

48. The self-contained crewman module of claim 45, wherein said network allows communication between the gunner module and a simulation system, such that a trainee in said simulation system participates with said gunner trainee in a common virtual environment.

49. The self-contained crewman module of claim 45, wherein said network allows simulated radio communication between said gunner trainee and other individuals that are equipped with simulated radios.

50. The self-contained crewman module of claim 45, wherein said weapons system comprises:
a traverse ring encoder that creates ring-position data based on the orientation of a traverse ring;
a slip ring that permits unrestricted rotation of the traverse ring;
a calibration mechanism that can be activated by said gunner trainee;
a weapon mockup that generates pitch, yaw, and trigger pull data based on manipulation of said mockup by said gunner trainee; and
an interface device that receives and forwards to said computational system, said ring position data, said calibration signal, and said pitch, yaw, and trigger pull data.

51. The self-contained crewman module of claim 45, wherein said computational system comprises:
network software; and
weapon simulation software,
wherein said weapon simulation software receives said pitch, yaw, and trigger pull data, computes a trajectory and position data for virtual ordinance, outputs said position data to said network software, and receives own vehicle state data from said network software to compute a weapon position.

52. The self-contained crewman module of claim 45, wherein said computational system further comprises visual simulation software that receives head-tracker data and renders an image based on said Lead-tracker data, vehicle state data received from network software, and own weapon projectile data.

53. The self-contained crewman module of claim 45, wherein said head-mounted display comprises: a head-tracker system that detects the orientation of the head of said gunner trainee and sends resulting data to said computational system, wherein said head-mounted display receives video data from said computational system and presents an image based on said video data to said gunner trainee.

54. The self-contained crewman module of claim 45, wherein said computational system comprises sound simulation software, and said sound system receives audio that is generated by sound I/O software on the basis of sound data from said sound simulation software, wherein said sound data is determined by said sound simulation software on the basis of weapon and vehicle data received from network software.

55. The self-contained crewman module of claim 33, wherein said gunner module presents a simulated environment to said gunner trainee at one of a plurality of levels of fidelity, the plurality of levels of fidelity representing varying amounts of relative functional realism of vehicle or weapon controls in the virtual multi-crew member vehicle.

56. The self-contained crewman module of claim 33, wherein said gunner module fits into a portable structure approximately eight feet wide or less.

57. The self-contained crewman module of claim 33, wherein the gunner module is tabletop mounted and presents a simulated environment to said gunner trainee at a relatively low level of fidelity, wherein:
rotation of the weapon is simulated in software, where said rotation is controlled by foot pedals operated by the gunner trainee; and
the gunner trainee is seated in front of the weapon mockup.

58. The self-contained crewman module of claim 32, further comprising:
a network communications module configured to connect the self-contained crewman module to a communications network,
wherein the self-contained crewman module is configured to be connected via the network communications module to the structurally self-contained second crewman module,
wherein crewman modules of similar or different types may be added or deleted from the simulation environment by connecting to or disconnecting from, respectively, the communications network,
wherein the simulation environment is common to the self-contained crewman module and the structurally self-contained second crewman module, communications between the modules being communicated via the communications network, and
wherein the self-contained crewman module is further configured to customize the virtual environment by the use of the simulation software so that the virtual environment remains representative of the shared simulation environment, and the virtual environment can be configured uniquely for the crewman position of the self-contained crewman module.

59. The self-contained crewman module of claim 32, wherein said mechanical mockup comprises at least one of a simulated sensing device, a simulated control device of the vehicle, or a simulated navigational device of the vehicle.

\* \* \* \* \*